United States Patent
Wiebers

(10) Patent No.: US 9,682,784 B1
(45) Date of Patent: Jun. 20, 2017

(54) PILOT NOTES PRESENTING SYSTEM, DEVICE, AND METHOD

(71) Applicant: Rockwell Collins, Inc., Cedar Rapids, IA (US)

(72) Inventor: Steven John Wiebers, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/087,687

(22) Filed: Mar. 31, 2016

(51) Int. Cl.
| | |
|---|---|
| *G08B 21/00* | (2006.01) |
| *B64D 43/00* | (2006.01) |
| *G06T 11/60* | (2006.01) |

(52) U.S. Cl.
CPC .............. *B64D 43/00* (2013.01); *G06T 11/60* (2013.01)

(58) Field of Classification Search
CPC ....... B64D 43/00; G08G 5/0034; G01C 21/20
USPC ........................................ 340/945, 963, 971
See application file for complete search history.

(56) References Cited

U.S. PATENT DOCUMENTS

| | | | |
|---|---|---|---|
| 7,411,493 B2* | 8/2008 | Smith ..................... | H04W 4/02 340/539.11 |
| 8,723,696 B1 | 5/2014 | VanderKamp et al. | |
| 2015/0339932 A1* | 11/2015 | Ramanna ............. | G08G 5/0013 701/528 |
| 2016/0111007 A1* | 4/2016 | Dennerline .......... | G08G 5/0034 701/528 |
| 2016/0125743 A1* | 5/2016 | Shorter, Jr. .......... | G08G 5/0034 701/528 |

\* cited by examiner

*Primary Examiner* — Toan N Pham
(74) *Attorney, Agent, or Firm* — Daniel M. Barbieri; Donna P. Suchy; Angel N. Gerdzhikov

(57) ABSTRACT

A system, device, and method for generating pilot-created notes and presenting them on a display unit are disclosed. The system may include a source of notes data, a display unit configured to display an image corresponding to a geographic region represented in an image data set, and a processing unit (PU). The PU may acquire note data, generate visual note data, and update the image data set of the image being displayed by the display unit as function of the visual note data. The note data could be acquired in response to a request corresponding to a geographic region being displayed. Once acquired, the PU could generate visual note data representative of at least one or more visual notes corresponding to a location of an event found within the geographic region. Then, the image data set could be updated as a function of the visual note data.

20 Claims, 15 Drawing Sheets

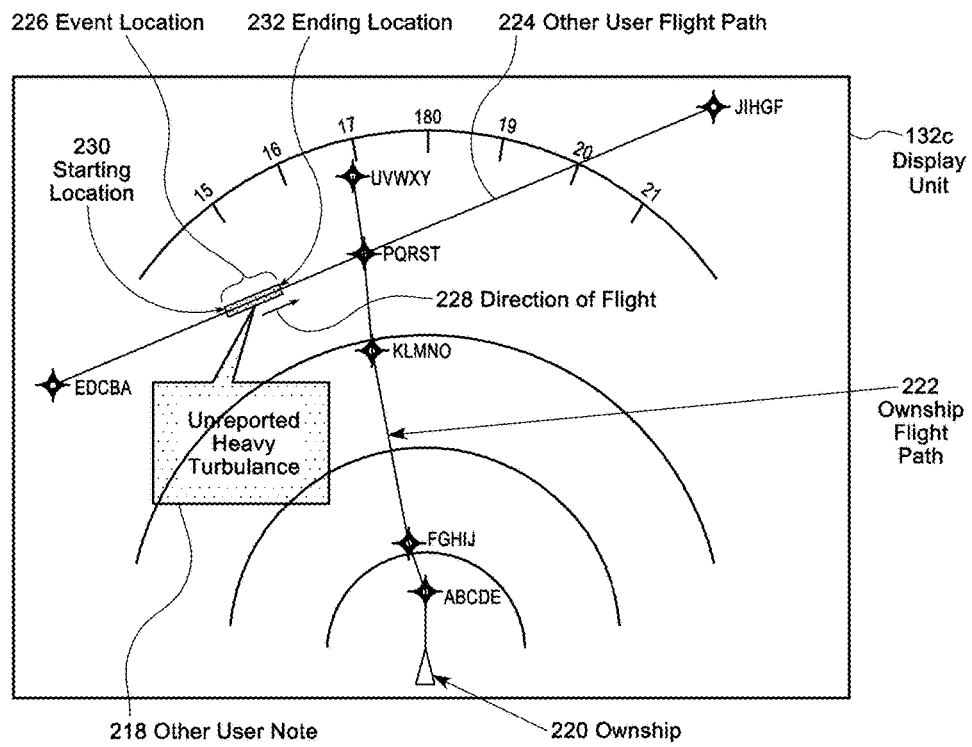
FIG. 6A
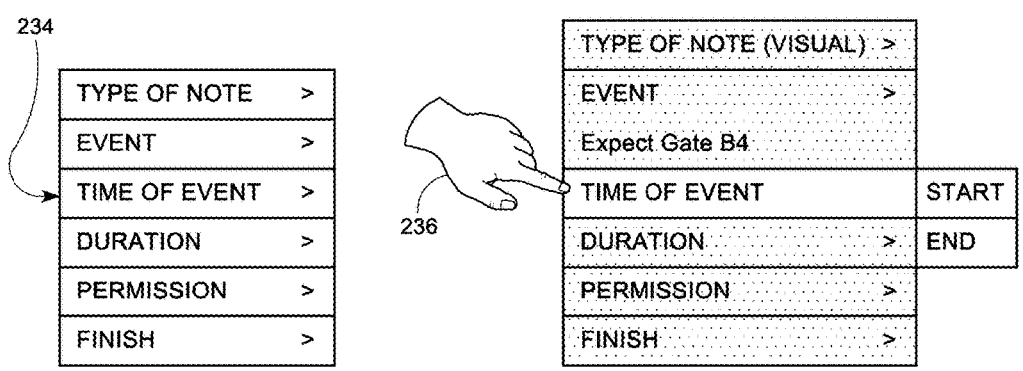
FIG. 6B
FIG. 6C

PILOT NOTES PRESENTING SYSTEM, DEVICE, AND METHOD

BACKGROUND

Pilots make notes. Pilots make notes on weather, charts, and maps to highlight points of interest or serve as memory reference points. Pilots carry flight-specific notes in hard copy and refer to them during the flight. Unfortunately, this could contribute to cockpit clutter and provide a head-down distraction when referencing the notes.

The United States Federal Aviation Administration (FAA) provides numerous services to pilots including reports of condition and/or events which could enhance a pilot's situational awareness. Included in these services are the PIREP (pilot report), SIGMET (significant meteorological information) Convective SIGMET, AIRMET (airmen's meteorological information), and NOTAM (notice to airmen). Briefly, the PIREP is created by the FAA in response to a pilot's reporting of actual weather conditions. The SIGMET is created to provide meteorological information which may concern all aircraft. The Convective SIGMET is issued for an area of thunderstorms. The AIRMET is created to provide concise weather phenomena that could affect aircraft safety. The NOTAM is issued to alert pilots of potential hazards that could affect the safety of flight enroute or at a specific location.

Although these services provide important information—sometimes, vital information—to pilots, there may be times where these reports are neither timely nor capture other information useful to the pilot about a location or event that has been observed by the pilot but not reported.

SUMMARY

Embodiments of the inventive concepts disclosed herein are directed to a system, device, and method for generating pilot-created notes and presenting them on a display unit. The inventive concepts disclosed herein may provide timely notes that could be useful to other pilots.

In one aspect, embodiments of the inventive concepts disclosed herein are directed to a system for presenting notes to a pilot. The system may include a source of notes data, a display unit configured to display an image of notes represented in an image data set, and a processing unit (PU).

In a further aspect, embodiments of the inventive concepts disclosed herein are directed to a device for presenting notes to a pilot. The device could include the PU configured to perform the method disclosed in the following paragraph.

In a further aspect, embodiments of the inventive concepts disclosed herein are directed to a method for presenting notes to a pilot. When properly configured, the PU may acquire note data, generate visual note data, and update the image data set of the image being displayed. The note data could be acquired from the notes data source in response a request. The note data could include at least one first note and/or at least one second note corresponding to an event, where each note could be created by user and defined with a location of an event located within a geographic region being displayed to the user. The visual note data could include at least one first visual note and/or at least one second visual note corresponding to a location of an event. The image data set could be updated as a function of the visual note data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 6A depicts an exemplary embodiment of a note created by user occupying another aircraft displayed with the flight path of the aircraft occupied by the user.

FIG. 6B depicts an exemplary embodiment of a second interactive event box for creating a note.

FIG. 6C depicts an exemplary embodiment of a pilot's input on a field of the second interactive event box.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1A:
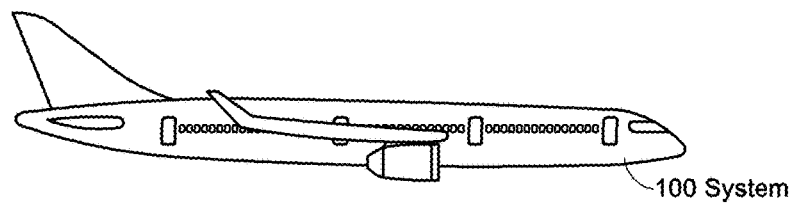
FIG. 1A depicts an aircraft configured with a pilot notes presentation system according to the inventive concepts disclosed herein.
Figure 1B:
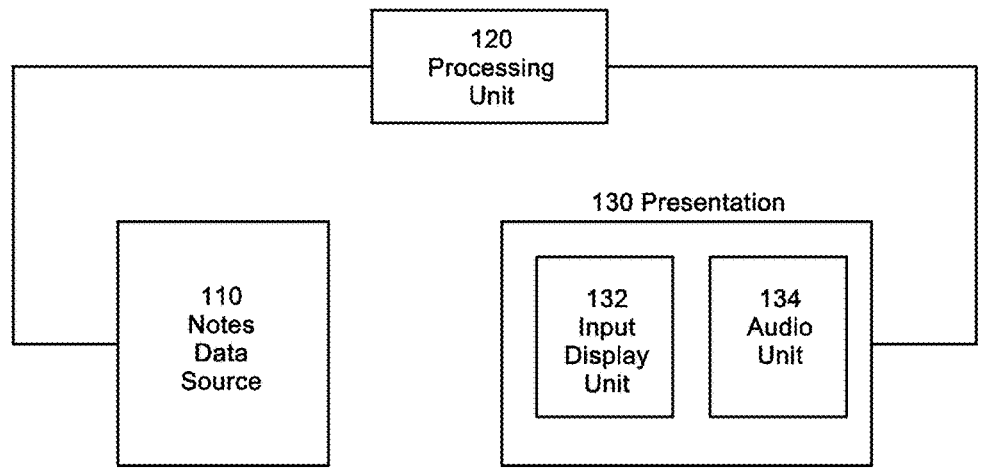
FIG. 1B depicts a functional block diagram of the pilot notes presentation system of FIG. 1A.

Referring now to FIGS. 1A-1B an embodiment of a pilot notes presentation system 100 suitable for implementation of the techniques described herein includes a notes data source (NDS) 110, a processing unit (PU) 120, and a presentation system 130.

The NDS 110 could include any source(s) configured to receive, store, and/or provide pilots' notes data including a database. The NDS 110 could include any digital memory storage device or a non-transitory computer-readable media configured to receive and store data representative of notes that have been created by pilots. In some embodiments, the notes may be created through an input device receiving a pilot's notes. Such input devices could include, but are not limited to, a tactile device (e.g., keyboard, control display unit, cursor control device, stylus, electronic grease pen, handheld device, touch screen device, notebook, tablet, electronic flight bag, or a user-wearable device) and/or speech recognition systems.

In some embodiments, the NDS 110 may be employed by an owner or operator of a plurality of aircraft. In some embodiments, access to the NDS 110 may be limited or restricted to pilots employed (i.e., used) to fly one or more aircraft of the plurality and who are a group of pilots who are enabled to create pilot notes and have them stored in the NDS 110 so that they may be shared with all of those in the group.

The PU 120 could include any electronic data processing unit which executes software or computer instruction code that could be stored, permanently or temporarily, in a digital memory storage device or a non-transitory computer-readable media (generally, memory 122) including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The PU 120 may be driven by the execution of software or computer instruction code containing algorithms developed for the specific functions embodied herein. The PU 120 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the PU 120 could also include more than one electronic data processing unit. In some embodiments, the PU 120 could be a processor(s) used by or in conjunction with any other system of the aircraft including, but not limited to, the NDS 110 and the presentation system 130.

In some embodiments, the terms "programmed" and "configured" are synonymous. In some embodiment, the term "data" could include any analog or digital signal, either discrete or continuous, which could contain information or be indicative of information. The PU 120 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the PU 120 via a physical or a virtual computer port. The PU 120 may be programmed or configured to execute the method discussed in detail below. The PU 120 may be programmed or configured to provide input and/or output data to various systems and/or units including, but not limited to, the NDS 110 and/or the presentation system 130.

The presentation system 130 could include any unit of which visual and/or aural indications may be presented to the pilot including, but not limited to, at least one display unit 132 and/or an audio unit 134. The display unit 132 may include display units configured to present information visually to the pilot. The display unit 132 could be part of an Electronic Flight Information System (EFIS) and could be include, but not be limited to, a Primary Flight Display (PFD), Navigation Display (ND), Head-Up Display (HUD), Head-Down Display (HDD), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphones, tablets), and/or user-wearable devices such as wrist- and head-mounted devices. The display unit 132 may be configured to present one or more display(s) or image(s). In some embodiments, the terms "display" and "image" are interchangeable and treated synonymously.

The audio unit 134 may include any unit configured to receive, produce, and/or present a pilot's note aurally to a listening pilot. In some embodiments, the audio file may be created as a pilot note through a speech recognition system, stored in the NDS 110 and accessible by the PU 120 in response to receiving a request for note data.

Some advantages and benefits of the inventive concepts disclosed herein are shown in FIGS. 2A through 6C, illustrating how notes created by one pilot may be shared with the others by informing them of events they have experienced or providing them pilots with unknown, additional information about known events. Through the sharing of information, situational awareness of the pilots may be enhanced by visually conveying notes of observed and/or experienced noteworthy events. Upon being viewed, the pilot could prepare for a possible event that has been experience by another pilot.

Figure 2A:
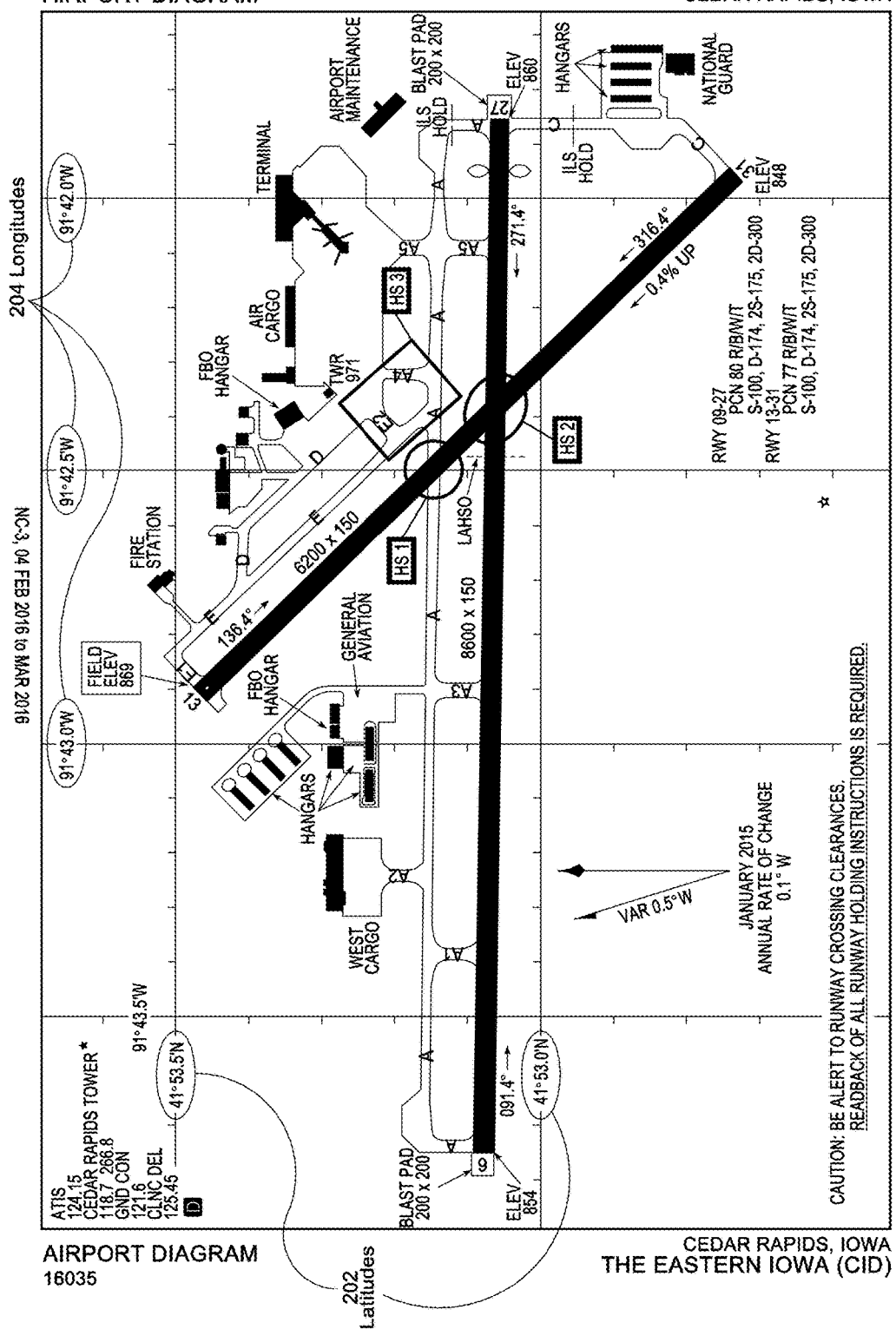
FIG. 2A presents an exemplary embodiment of a chart known as an Airport Diagram.

Referring now to FIG. 2A, an exemplar of a chart known as an Airport Diagram for Eastern Iowa Airport (CID) located in Cedar Rapids, Iowa, Unites States published by the United States Federal Aviation Administration (FAA) is illustrated; as shown, the chart includes geographic information of latitudes 202 and longitudes 204. It should be noted that the Airport Diagram is provided for the sole purpose of discussing the exemplary concepts disclosed herein and should not to be used or relied upon for the purpose of navigation. Although the discussion will be drawn to the Airport Diagram, the FAA publishes many types of aeronautical charts. Examples of these have has been disclosed by Raghu et al in U.S. Pat. No. 8,878,872 entitled "System, Device, and Method for Generating an Overlay of Navigation Chart Information," which is hereby and herein incorporated by reference in its entirety.

Another publisher of aeronautical charts is Jeppesen. Headquartered in Inverness, Colo., United States, Jeppesen is owned by The Boeing Company, a well-known manufacturer of aircraft. Colloquially referred to as "Jepp charts" or "Jepps," Jeppesen IAP charts are popular among pilots, and their popularity extends to electronic charts that replicate the paper IAP charts on electronic displays. Although the discussion will be drawn to the Airport Diagram published by the FAA, the embodiments herein are not limited to the Airport Diagram or other navigation charts published by the FAA.

Figure 2B:
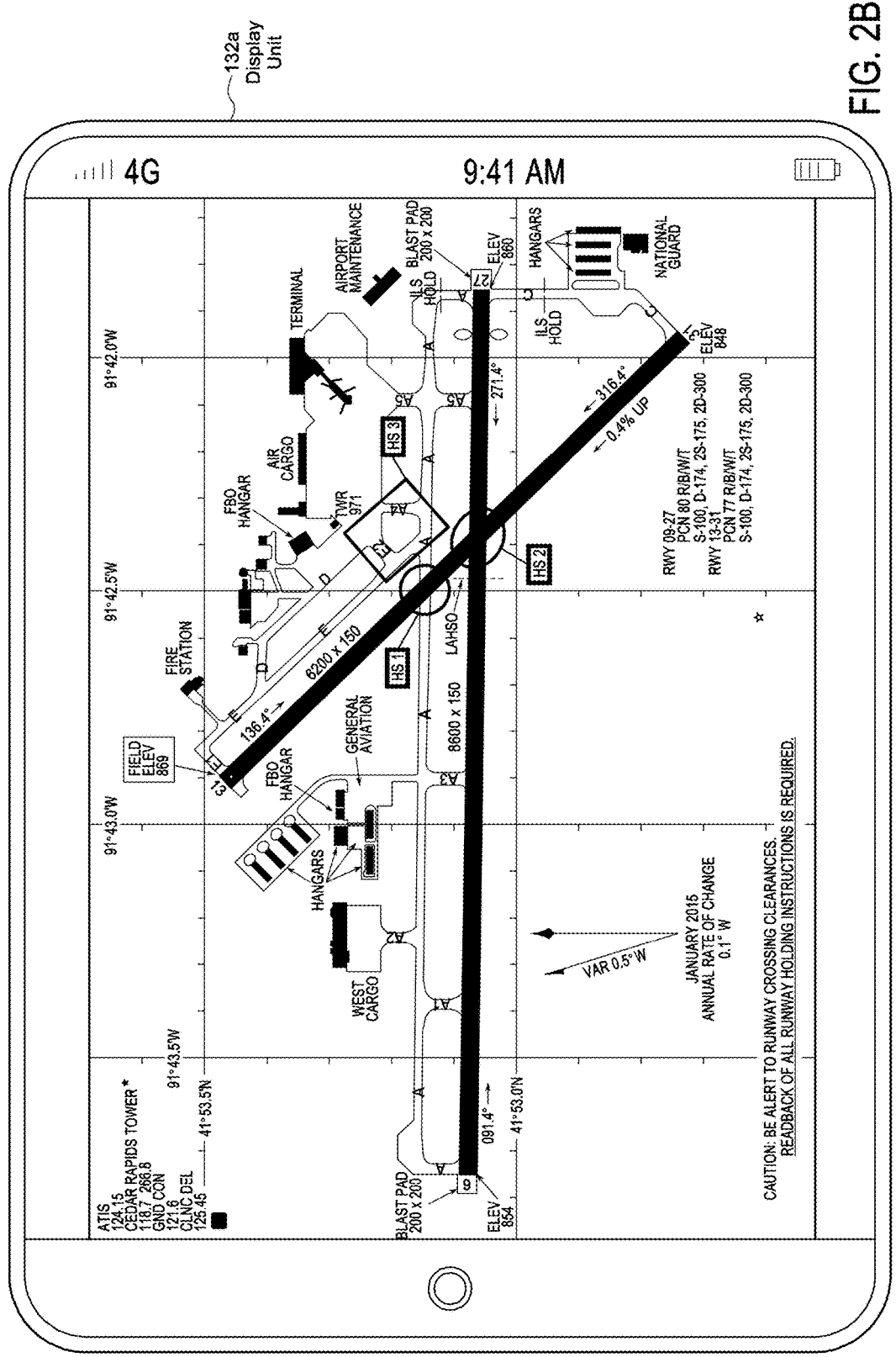
FIG. 2B depicts an exemplary embodiment of an electronic tablet presenting the Airport Diagram.

Referring now to FIG. 2B, the display unit 132a is an electronic tablet configured to display the shown chart shown in FIG. 2A. Here, the chart could appear after making a selection of an application or "app" from the home screen of the tablet, where the app may be designed to allow the user to access the chart via a selection of the app and a series of menu options which allow the user to drill down to the option from where the named chart may be accessed. Once displayed, the app could enable the user to create a note.

Figure 2C:
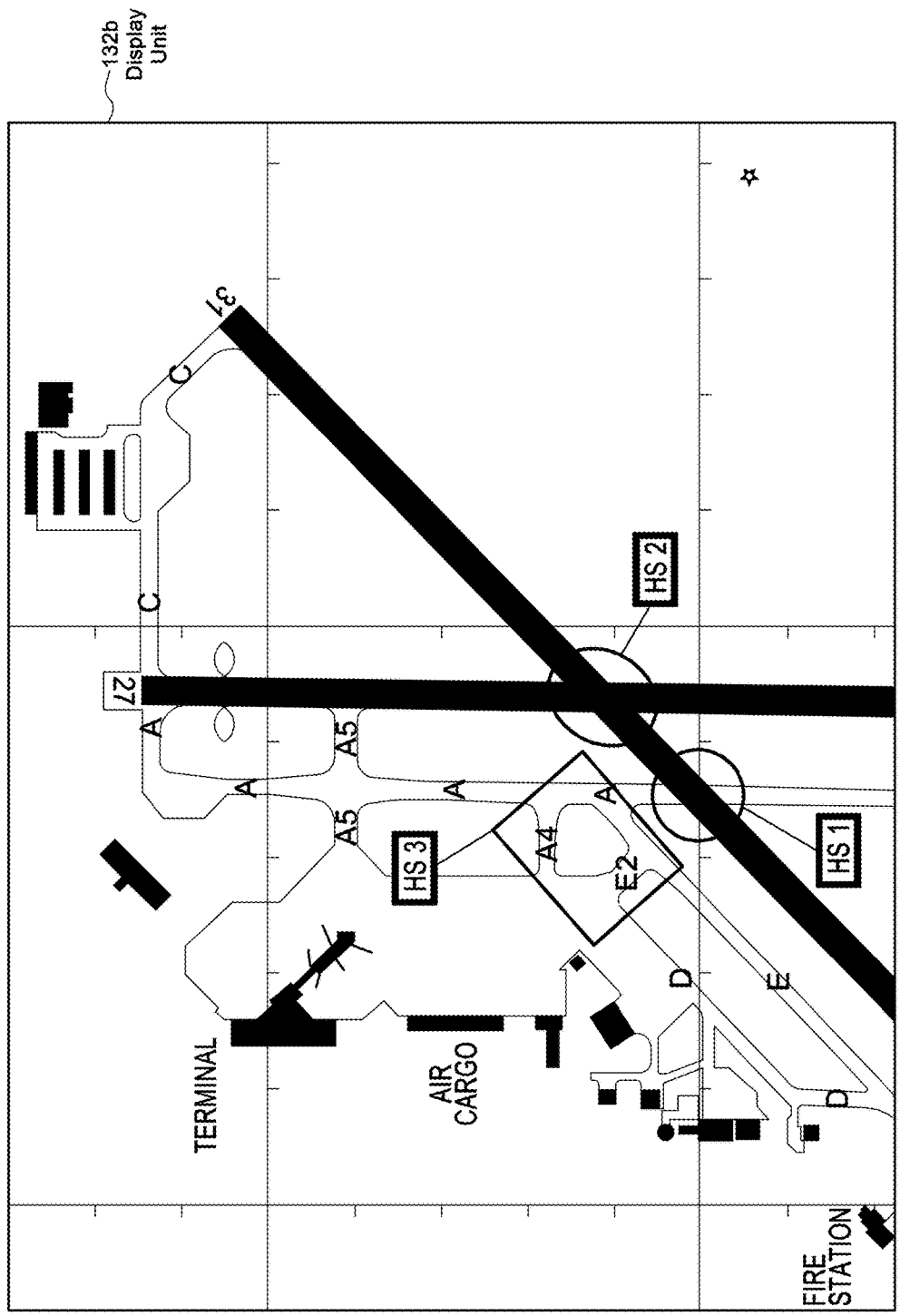
FIG. 2C depicts an exemplary embodiment of a display unit installed in an aircraft presenting an Airport Surface Moving Map (ASMM).

In addition to charts being displayed, navigation information may be created and displayed from sources other than those from which navigation charts may be replicated. Referring now to FIG. 2C, an Airport Surface Moving Map (ASMM) of CID is being displayed on the display unit 132b installed in the aircraft. In some embodiments, the source of the data used to create the Airport Diagram shown in FIG. 2A is different from the source used to create the image of the ASMM, but both sources of data could include data representative of geographic information corresponding to the ASMM and Airport Diagram. In some embodiments, the source of data from which the ASMM is created could include an aerodrome mapping database described in the following aviation industry standards published by RTCA, Incorporated (RTCA) and Aeronautical Radio, Incorporated (ARINC): RTCA DO-272A entitled "User Requirements for Aerodrome Mapping Information" and ARINC Specification 816-1 entitled "Embedded Interchange Format for Airport Mapping Database" (ARINC 816), each of which is herein incorporated by reference in its entirety. DO-272A provides for aerodrome surface mapping requirements for aeronautical uses on-board aircraft, and ARINC 816 defines an open encoding format for airport databases that may be loaded in aircraft systems.

Figures 3A, 3C, 3D, 3E:
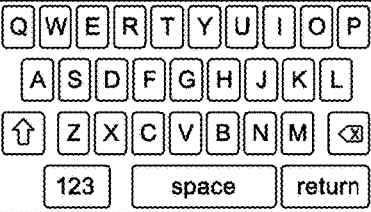
FIG. 3A depicts an exemplary embodiment of an interactive event box for creating a note.
FIG. 3C depicts an exemplary embodiment of a pilot's input on a first field of the interactive event box.
FIG. 3D depicts an exemplary embodiment of a pilot's input on a second field of the interactive event box.
FIG. 3E depicts an exemplary embodiment of a pilot's input on a third field of the interactive event box.

Referring now to FIG. 3A, a simplified configuration of an interactive event box that may be used for creating a note is shown for the purposed of illustration. The event box includes the following interactive fields: TYPE OF NOTE, EVENT, LOCATION, DURATION, PERMISSION, and FINISH. For TYPE OF NOTE, the user may specify the note as either a visual or audio note. For EVENT, the user may describe the event for which the note is being created. For LOCATION, the user may select the location corresponding to the event. For DURATION OF NOTE, the user may specify the duration of the note, that is, the length of time that the note will be accessible. For PERMISSION, the user may select who has access to the note. For FINISH, the user may select a disposition of the note.

Figure 3B:
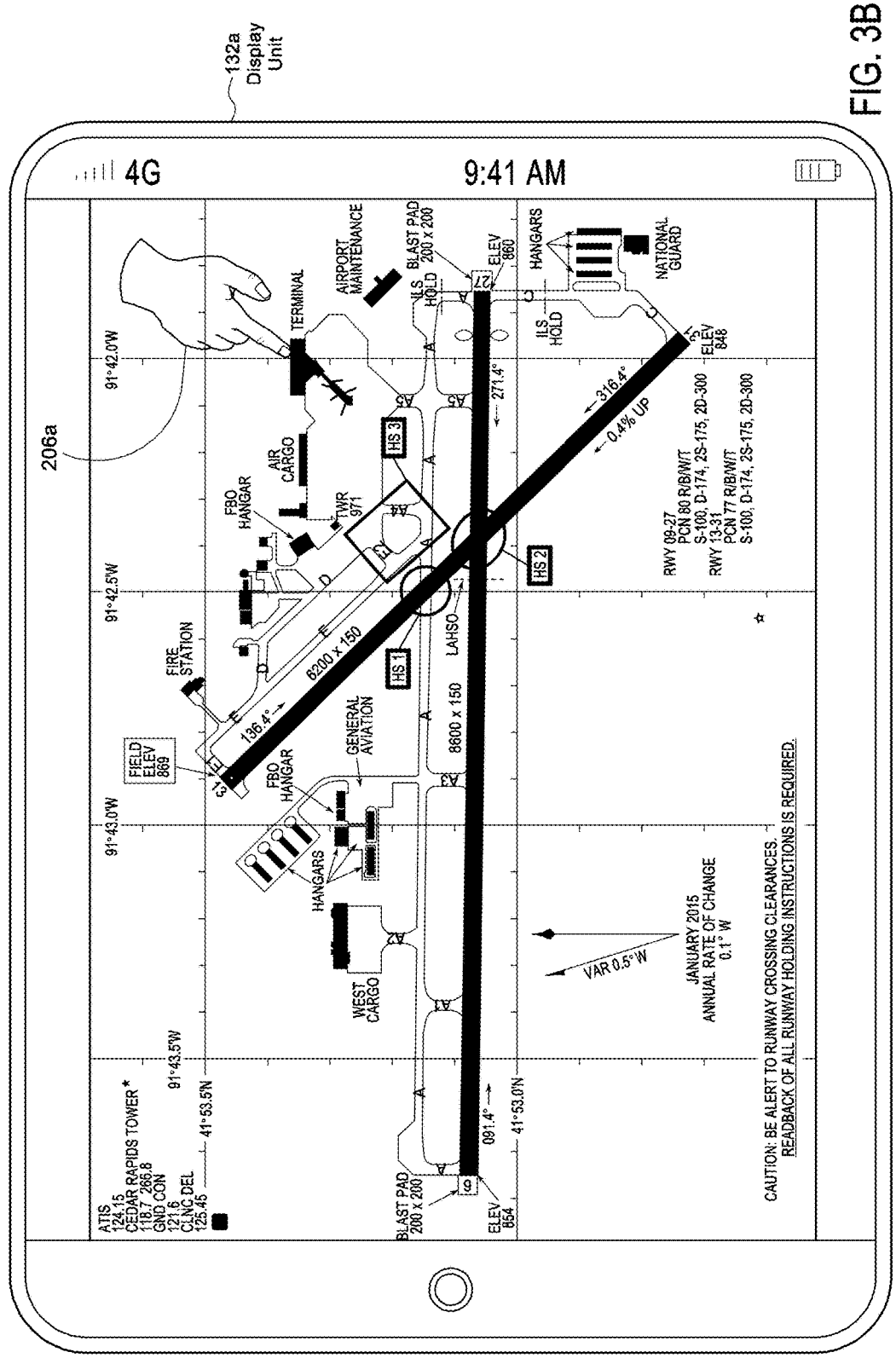
FIG. 3B depicts an exemplary embodiment of a pilot's input made on the electronic tablet of FIG. 2B from which the interactive event box may appear.

Referring now to FIG. 3B, it will be assumed that an aircraft in which a current user is located (i.e., ownship) is being flown and approaching CID. When the aircraft is thirty minutes away from landing at CID, the current user learns that ownship has been assigned to Gate B4. Planning ahead, the current user accesses the Airport Diagram by physically retrieving the display unit 132a on which the pilot may create a note. By selecting TERMINAL with a tap of the finger (item 206a), the interactive event box may appear.

Referring now to FIG. 3C, the current user has tapped the TYPE OF NOTE field (item 206b) to specify the note as being either a visual or audio note. In response, the fields VISUAL and AUDIO appear; in some embodiments, the current user could have spoken the words TYPE OF NOTE to display these fields through voice recognition. If the note being created is a visual note, VISUAL may be selected by tapping or talking; if the note is being created as a digital audio file, AUDIO may be selected. For the purpose of this illustration, VISUAL will be selected.

Referring now to FIG. 3D, the selection of VISUAL is shown with TYPE OF NOTE. In addition, the current user has tapped EVENT field (item 206c) to enter a description of the event. In response, a blank field and a keyboard may appear; in some embodiments, the current user could have spoken the word EVENT to display these. If the note being created is a visual note, the blank field may be tapped, and the words "Expect Gate B4" could be entered with the keyboard or through voice recognition through spoken word; if the note is being created as a digital audio file, the current user could record "Expect Gate B4" for future listening (or a loquacious pilot could record more than "Expect Gate B4"). For the purpose of this illustration, "Expect Gate B4" will be entered with the keyboard.

Referring now to FIG. 3E, the entry of the event is shown below EVENT. In addition, the current user has tapped the LOCATION field (item 206d) to specify the location corresponding to the note. In response, the fields SELECTED, CURRENT, and OTHER appear; in some embodiments, the current user could have spoken the word LOCATION to display these fields. As discussed above, TERMINAL was selected on the Airport Diagram. Because the gate assignment corresponding to a gate at the terminal, the SELECTED field may be selected by tapping or talking; if the note is being created as a digital audio file, the SELECTED field may be selected. If the current user wishes to create a note corresponding to the aircraft's current location (obtainable, for instance, through the aircraft's navigation system), CURRENT may be selected. If the current user wishes to create a note corresponding to another location, OTHER may be selected; in response, latitude/longitude fields may appear, bearing/distance from the aircraft's current location may appear, or other fields configurable to a manufacturer and/or end-user may be employed to define the location corresponding to the note. For the purpose of this illustration, the SELECTED field will be selected, and the geographic information of the note is defined by the selection.

Figure 3F:
FIG. 3F depicts an exemplary embodiment of a pilot's input on a fourth field of the interactive event box.

Referring now to FIG. 3F, the geographic location (shown as latitude/longitude coordinates) corresponding to the SELECTED field is shown with LOCATION. In addition, the current user has tapped the DURATION OF NOTE field (item 206e) to specify the duration of the note. In response, the fields ONE HOUR, TODAY, and OTHER appear; in some embodiments, the current user could have spoken the word DURATION OF NOTE to display these fields. If the current user wishes to create a note that may be accessible for no more than one hour, ONE HOUR may be selected. If the current user wishes to create a note that may be accessible for the current day only, TODAY may be selected. If the current user wishes to create a note that may be accessible for another duration, OTHER may be selected; in response, a start date/time and end date/time fields may appear or other fields configurable to a manufacturer and/or end-user may be employed to define the duration corresponding to the note. For the purpose of this illustration, ONE HOUR will be selected.

Figure 3G:
FIG. 3G depicts an exemplary embodiment of a pilot's input on a fifth field of the interactive event box.

Referring now to FIG. 3G, the selection of ONE HOUR is shown with DURATION OF NOTE. In addition, the current user has tapped the PERMISSION field (item 206f) to specify to whom the note is accessible. In response, the fields SELF and OTHER USERS appear; in some embodiments, the current user could have spoken the word PERMISSION to display these fields. If the current user wishes to create a note that may be accessible to him or her only and not shared with others, SELF may be selected. If the current user wishes to create a note that may be shared with other pilots, OTHER USERS may be selected. For the purpose of this illustration, SELF will be selected.

Figure 3H:
FIG. 3H depicts an exemplary embodiment of a pilot's input on a sixth field of the interactive event box.

Referring now to FIG. 3H, the selection of SELF is shown with PERMISSION. In addition, the current user has tapped the FINISH field (item 206g) to select a disposition of the note. In response, the fields ADD and CANCEL appear; in some embodiments, the current user could have spoken the word PERMISSION to display these fields. If the pilot wishes to create the note, ADD may be selected. If the current user decides against creating a note, CANCEL may be selected. For the purpose of this illustration, ADD will be selected. In some embodiments, the date/time may be included in data representative of the note.

Figure 3I:
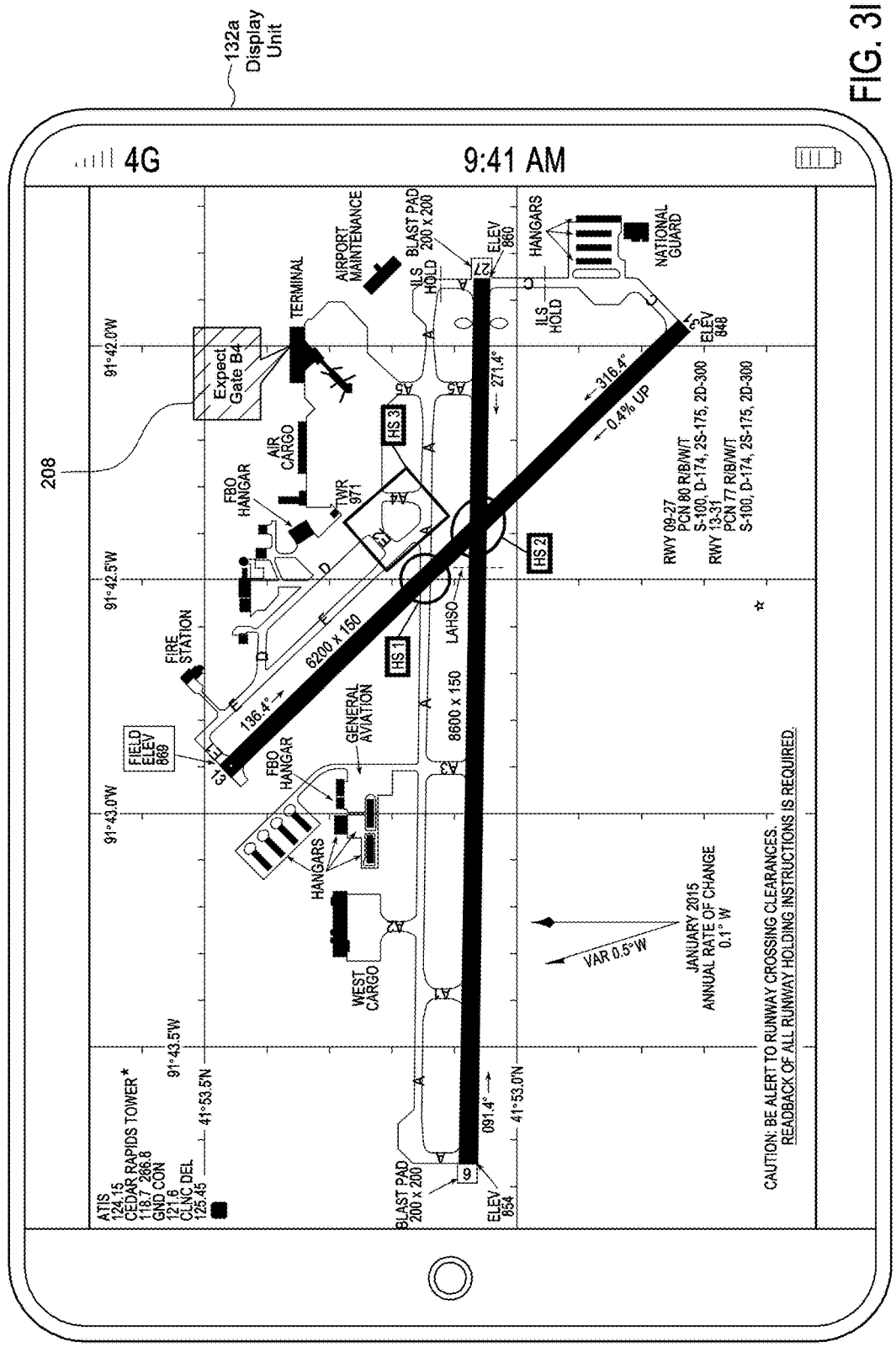
FIG. 3I depicts an exemplary embodiment of a note being displayed over the Airport Diagram resulting from the pilot's inputs.

Referring now to FIG. 3I, a current user note 208 described in the EVENT field and pointing to the location specified in the LOCATION field has been added as an overlay to the Airport Diagram in response to ADD being selected. In some embodiments a date/time of the note creation may be included when the note is being displayed (not shown in FIG. 3I). In some embodiments, data representative of the note may be sent by the PU 120 to the NDS 110 and, as defined by the pilot in the DURATION OF NOTE and PERMISSION fields, accessible to the PU 120 and displayable on one or more display units 132 viewable to the current user only for the next hour. In some embodiments, data representative of the note may be maintained in the display unit 132a through which the note was created and, as defined by the pilot in the DURATION OF NOTE and PERMISSION fields, accessible to the PU 120 and displayable to the current user only for the next hour.

Figure 4A:
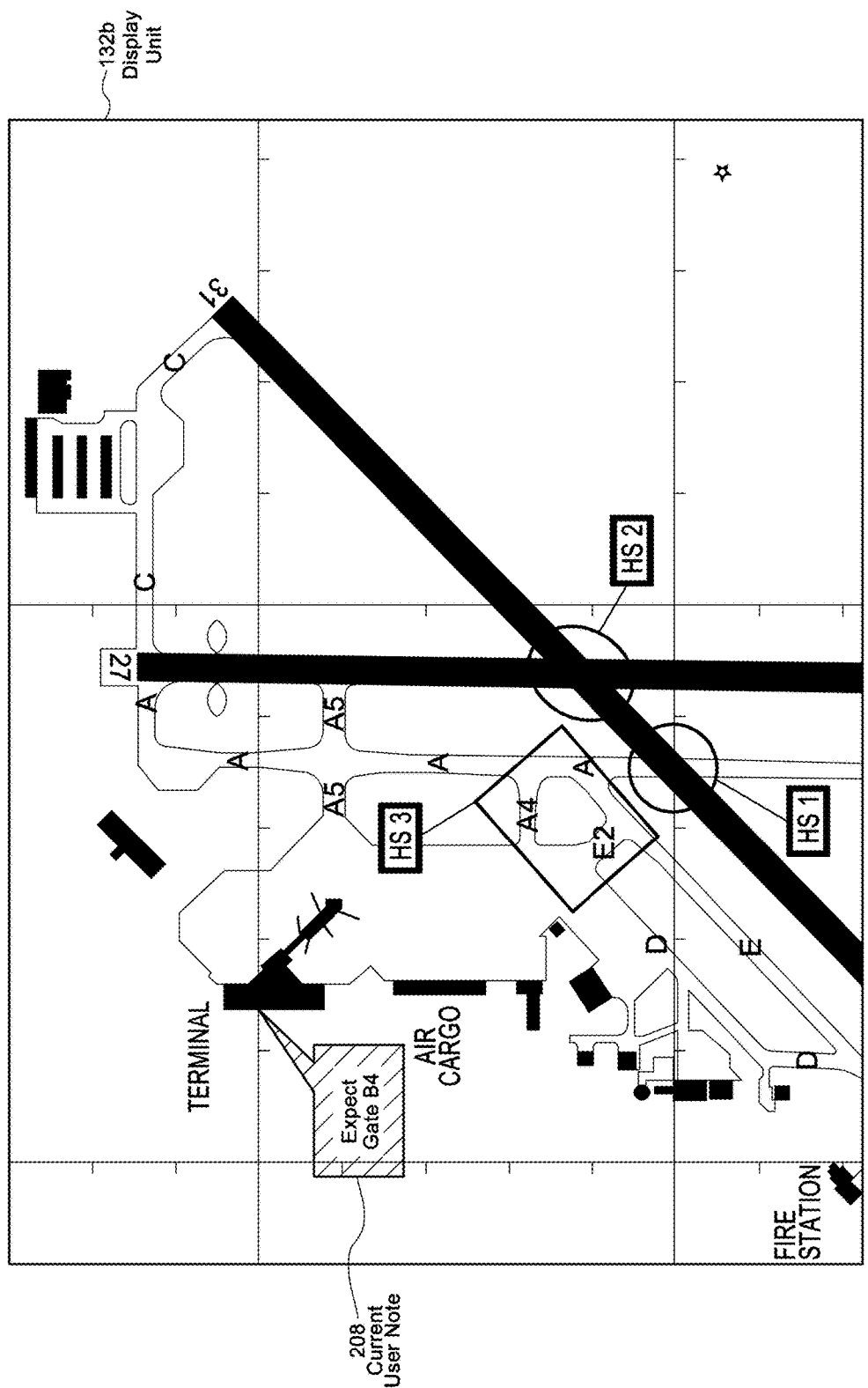
FIG. 4A depicts an exemplary embodiment of the note being displayed over the ASMM.

Referring now to FIG. 4A, it will be assumed that the aircraft has landed in CID thirty minutes after the note was created, and that the current user has stowed the electronic tablet prior to landing. Upon landing, the current user elects to view the ASMM being displayed on the display unit 132b rather than physically retrieving the electronic tablet. As shown, the note is displayed as an overlay on the display unit 132b, where the PU 120 may be configured to request and/or acquire available notes from one or more NDS 110 corresponding to the geographic region being displayed on the display unit 132b, where availability could depend upon the LOCATION, DURATION OF NOTE, and PERMISSION fields of the notes being stored in the NDS 110. Here, the PU 120 could determine that the latitude and longitude specified in the LOCATION field of the note falls within the geographic region, the note has not expired as specified by the current user with the DURATION OF NOTE field, and the identity of the viewer matches the current user corresponding to the PERMISSION field.

Figure 4B:
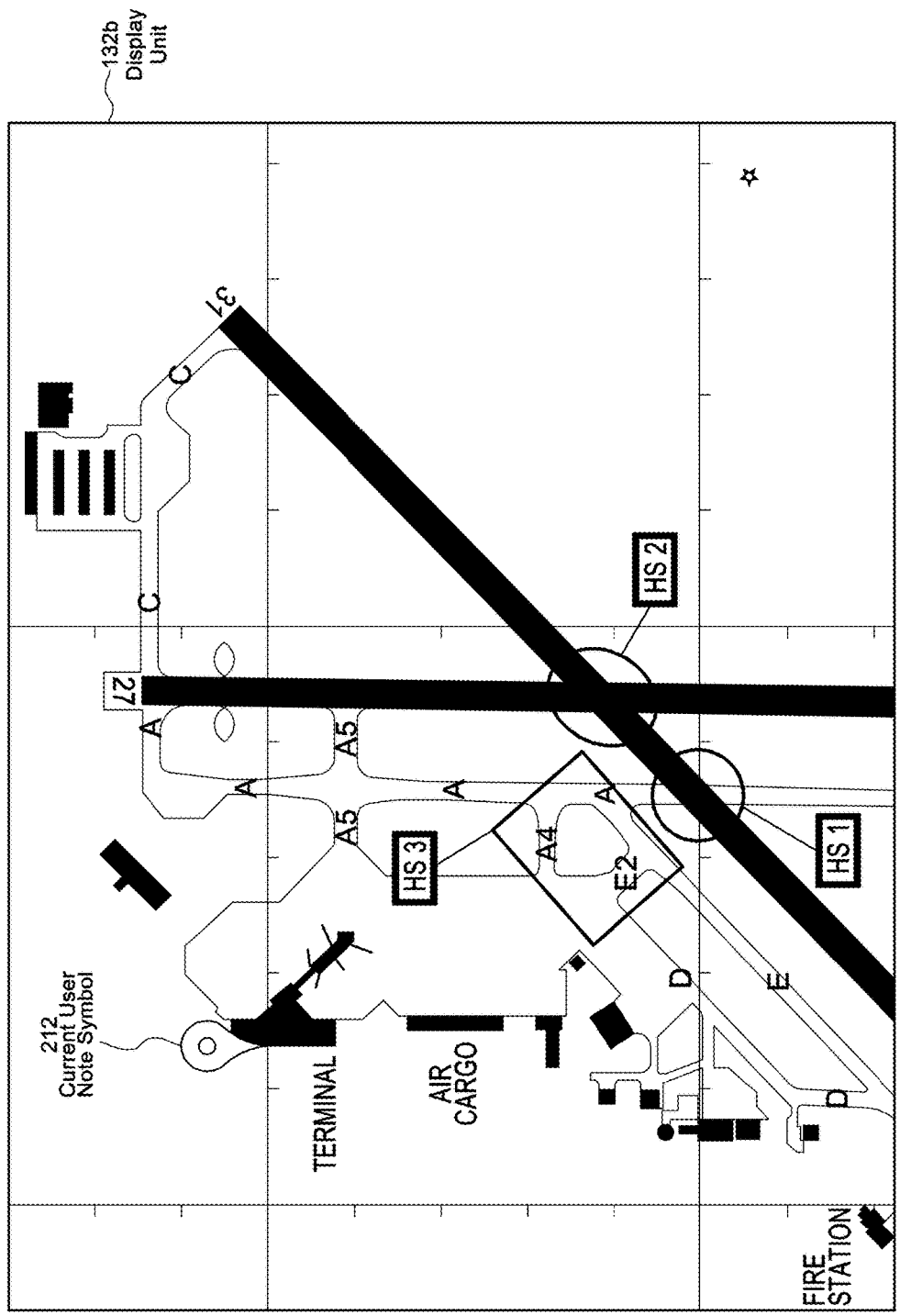
FIG. 4B depicts an exemplary embodiment of a symbol of the note being displayed over the ASMM.

Referring now to FIG. 4B, a symbol of a note is being displayed in place of the note to minimize the loss of information being displayed. Here, the note symbol informs the current user of the existence of a note available for viewing. In some embodiments, the symbol may be configured as an interactive symbol, and upon being selected by the current user, the note could appear as shown in FIG. 4A. In some embodiments, an audio note could be presented aurally upon the selection of the symbol.

Figure 5A:
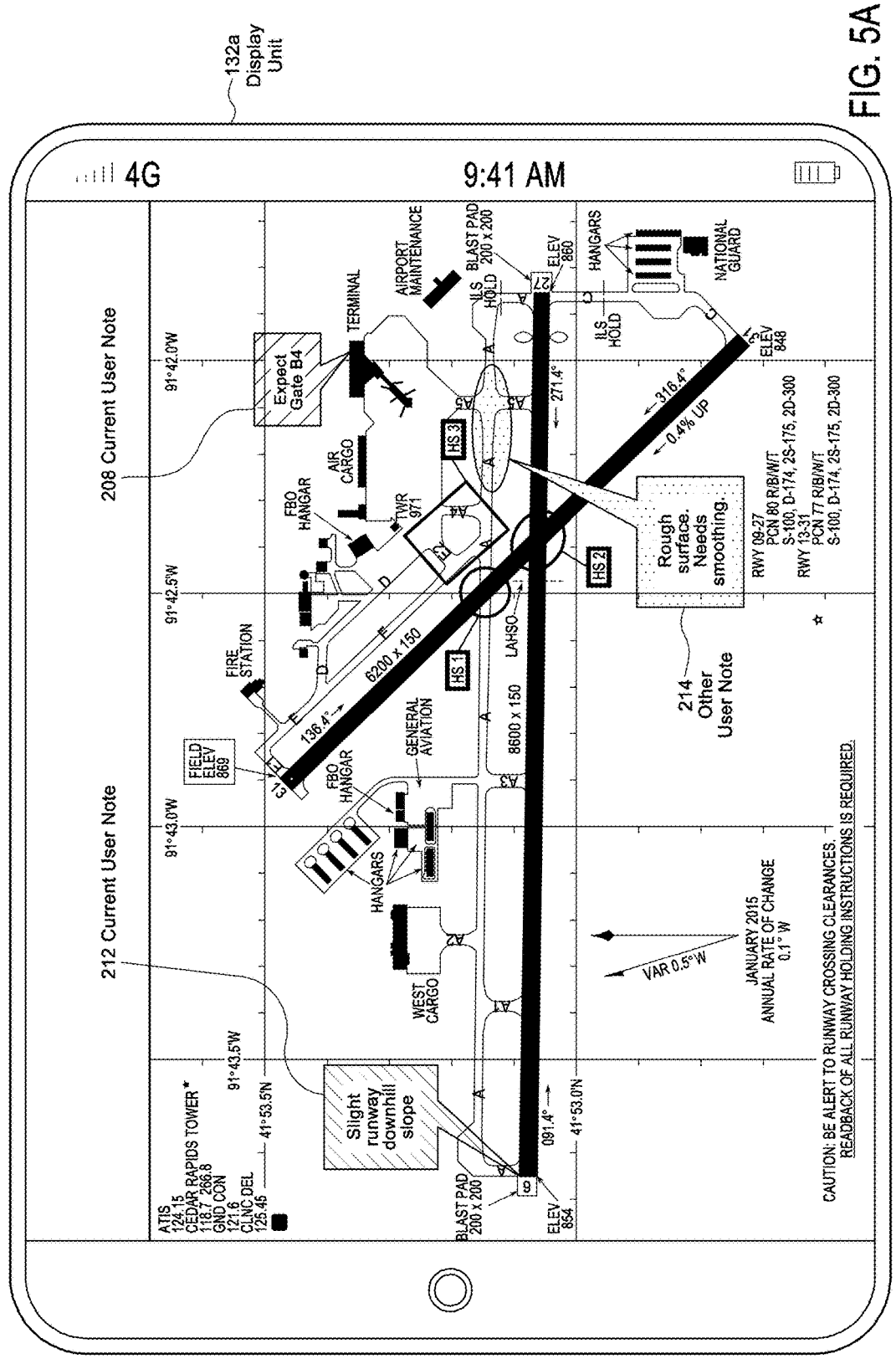
FIG. 5A depicts an exemplary embodiment of a plurality of notes being displayed over the Airport Diagram.

Referring now to FIG. 5A, the display unit 132a could display other notes created prior to or during the creation of the note. As shown, a current user note 212 and an other user note 214 are illustrated. In this illustration, the current user note 212 and the other user note 214 could have been created by the current user and another user, respectively, prior to the display of the Airport Diagram of FIG. 2B. Upon the Airport Diagram being displayed, the PU 120 could request and/or acquire available notes from the NDS 110 corresponding to the geographic region being displayed, where availability could depend upon a plurality of note fields including the LOCATION, DURATION OF NOTE, and PERMISSION fields of the notes.

Figure 5B:
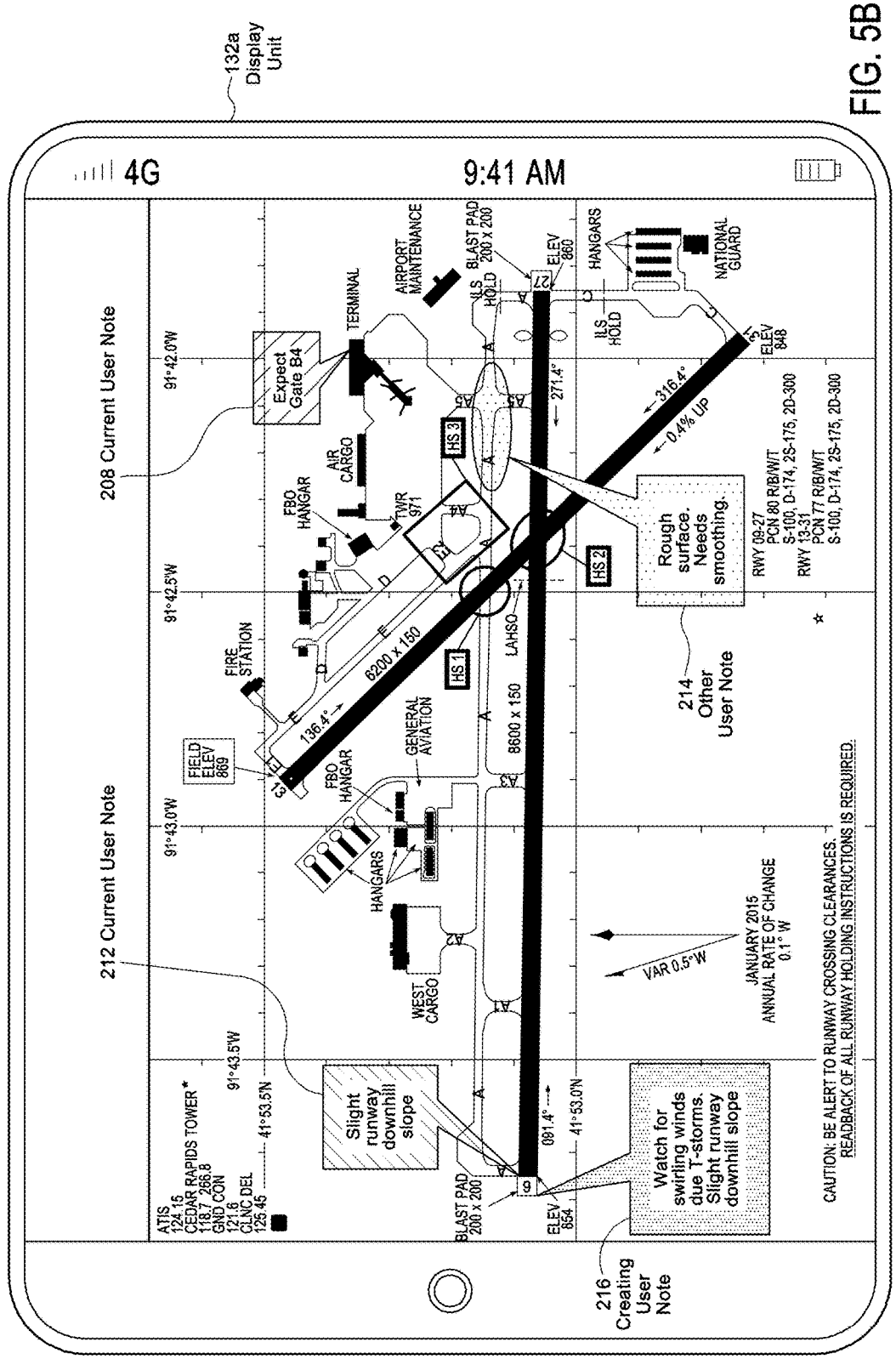
FIG. 5B depicts an exemplary embodiment of a second plurality of notes being displayed over the Airport Diagram.

Referring now to FIG. 5B, a creating user note 216 is displayed along with the current user note 212 and the other user note 214. In this illustration, the creating user note 216 could have been created by another user while the Airport Diagram is being displayed. If the creating user has made the creating user note 216 available, the PU 120 could request and/or acquire the available note as it corresponds to the geographic region being displayed. As a result, the creating user note 216 would come into view (or pop into view) while the Airport Diagram is being displayed.

Figure 5C:
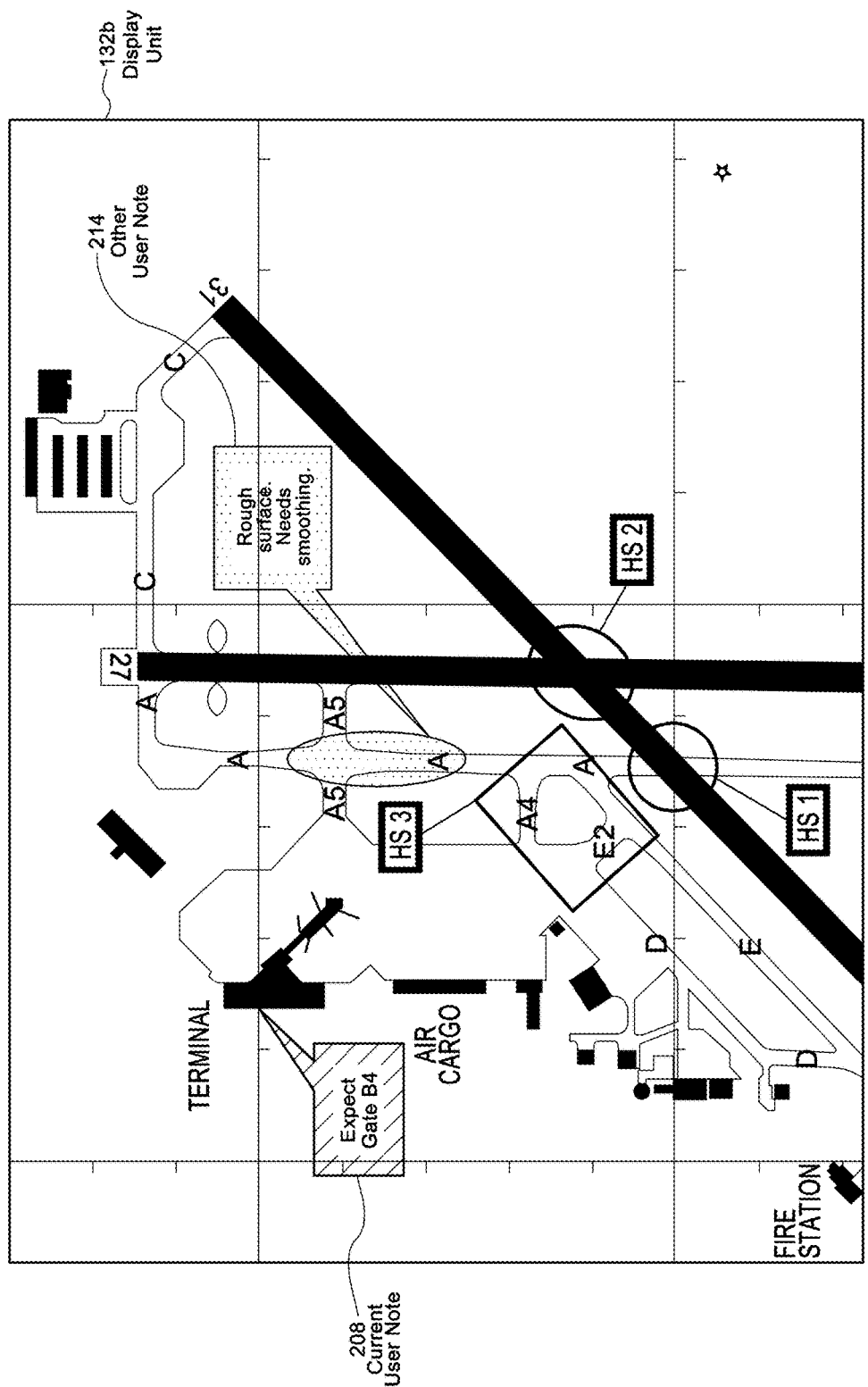
FIG. 5C depicts an exemplary embodiment of a plurality of notes being displayed over the ASMM.

Referring now to FIG. 5C, it will be assumed that the ASMM is being presented on display unit 132b, and that are all four notes are available. As shown, the current user note 208 is displayed along with the other user note 214; however, the current user note 212 and the creating user note 216 are not shown because the locations of these are not included in the geographic region being displayed (i.e., the location of the end of Runway 9).

The inventive concepts disclosed herein are not limited to the display of overlay notes of airport surfaces. Referring to FIG. 6A, an other user note 218 created by another user is being presented on the display unit 132c displaying a geographic region which includes ownship 220, ownship flight path 222 defined with waypoints ABCDE, FGHIJ, KLMNO, PQRST, and UVWXY, and other user flight path 224 defined with waypoints EDBCA, PQRST, and JIHGF. The other user flight path 222 may be indicative of a flight path of an aircraft that is occupied by another user whom created the other user note 218 of an event location 226 that occurred along the other user flight path 224 in a direction of flight 228, where the event location 226 defined with a starting location 230 and an ending location 232. In some embodiments, geographic locations (and altitudes) of the flight path at known times may be sequentially recorded by the FMS.

Referring no to FIG. 6B, an interactive event box is illustrated that is similar to the one shown in FIG. 3A. In some embodiments, the interactive event box could include a TIMES OF EVENT field 234.

Referring now to FIG. 6C, the other user has tapped the TIMES OF EVENT field 236 to specify start and end times of the event. In response, the fields START and END appear; in some embodiments, the other user could have spoken the word TIMES OF EVENT to display these fields. After making entries in both of these fields and upon selecting ADD of the FINISH field, the starting and ending locations 230 and 232 (and altitudes at those locations) corresponding to the start and end times may be determined from the FMS-recorded information. In some embodiments, a date/time (and altitude) of when the note was created may be included when the note is being displayed (not shown in FIG. 6A). In some embodiments, data representative of the other user flight path 224 sequentially recorded by the FMS may be included in the note as shown in FIG. 6A.

Figure 7:
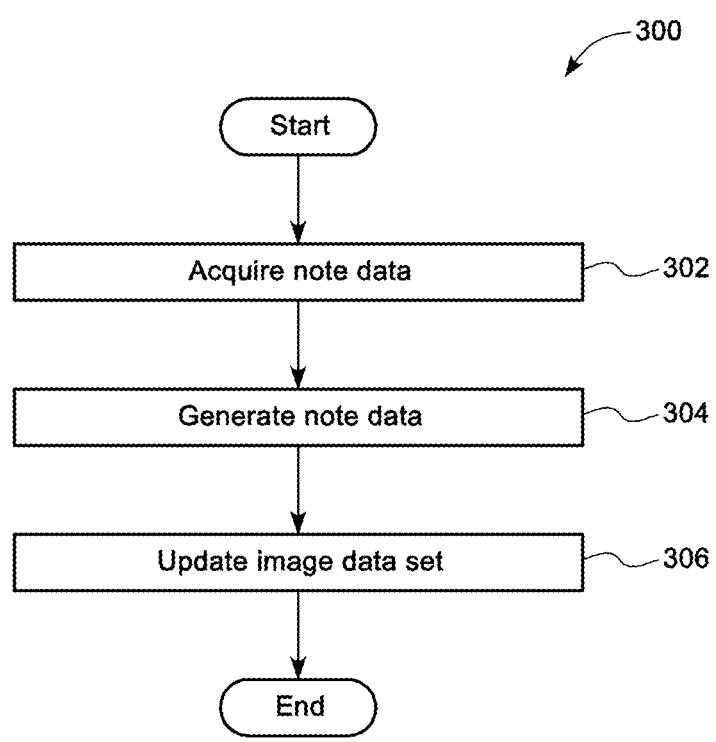
FIG. 7 depicts an exemplary embodiment of a flowchart disclosing a method for presenting one or more pilot notes according to the inventive concepts disclosed herein.

FIG. 7 depicts flowchart 300 disclosing an example of a method for presenting one or more pilot notes, where the PU 120 may be programmed or configured with instructions corresponding to the modules embodied in flowchart 300. In some embodiments, the PU 120 may be a processor or a combination of processors found in the presentation system 130 or any other system suitable for performing the task. Also, the PU 120 may be a processor of a module such as, but not limited to, a printed circuit card having one or more input interfaces to facilitate the two-way data communications of the PU 120, i.e., the receiving and providing of data. As necessary for the accomplishment of the following modules embodied in flowchart 300, the acquiring of data is synonymous and/or interchangeable with the receiving and/or retrieving of data, and the providing of data is synonymous and/or interchangeable with the making available or supplying of data.

The method of flowchart 300 begins with module 302 with the PU 120 acquiring note data that includes first note data, second note data, or both, where the NDS 110 may provide the PU 120 with the note data upon receiving request data requesting the note data. The request could provide an identification of the first user who is operating one aircraft (i.e., ownship) of a plurality of aircraft and viewing an image represented in an image data set which displays a geographic region.

In some embodiments, the first note data may be representative of one or more first notes created by the first user at a location specified by the first user which falls within the geographic region being displayed to the first user, where the one or more first note were created prior to the image of the geographical region being presented to the first user. A first note could relate to an event experienced or observed by the first user. The specified location could include a location selected by the first user, the current location of ownship, a location along the flight path of ownship, or a segment of the flight path. In some embodiments, the first note could include a date, time, and/or location information of when and/or where the note was created by the first user.

In some embodiments, the second note data may be representative of one or more second notes created by the second user at a location specified by the second user which falls within the geographic region being displayed to the first user. Similar to a first note, the second note could relate to an event experienced or observed by the second user. The specified location could include a location selected by the second user, the current location of an aircraft occupied by the second user, a location along the flight path of the aircraft occupied by the second user, or a segment of that flight path. In some embodiments, the second note could include a date, time, and/or location information of when and/or where the note was created by the second user.

The flowchart 300 continues with module 304 with the PU 120 generating visual note data including first visual note data and/or second visual note data corresponding to user-defined locations. In some embodiments, the first visual note data could be representative of at least one indication of a first note, where each indication may correspond to one first location of one first event. In some embodiments, at least one indication of a first note could include a visible note presenting a description of one first event. In some embodiments, at least one indication of a first note could include a symbol through which a visible note describing one first event is presented. In some embodiments, at least one indication of a first note could include a symbol through which an audio note representative of in an audio file describing one first event is presented aurally.

In some embodiments, the second visual note data could be representative of at least one indication of a second note, where each indication may correspond to one second location of one second event. In some embodiments, at least one indication of a second note could include a visible note presenting a description of one second event. In some embodiments, at least one indication of a second note could include a symbol through which a visible note describing one second event is presented. In some embodiments, at least one indication of a second note could include a symbol through which an audio note describing one second event is presented. In some embodiments, at least one indication of a second note could include a visual presentation of a flight path of an aircraft occupied by a second user.

The flowchart 300 continues with module 306 with the PU 120 updating image data representative of the image of the geographic region with first visual note data, second visual note data, or both. In some embodiments, indications of one or more first visual notes may be viewed as one or more first images overlaying the image of the geographic region. In some embodiments, indications of one or more second visual notes may be viewed as one or more second images overlaying the image of the geographic region. Then, the method of flowchart 300 ends.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

The invention claimed is:

1. A system for presenting notes to a pilot, comprising:
a network comprised of a plurality of users and a plurality of aircraft;
a notes data source comprised of notes data representative of a plurality of notes, where
each note of the plurality of notes is created by a user of the plurality of users who occupy aircraft of the plurality of aircraft and defined with a location of an event and an identification of the creating user; and
a processing unit including at least one processor coupled to a non-transitory processor-readable medium storing processor-executable code and configured to:
acquire request data representative of a request comprised of an identification of a requesting user and a geographic region being presented in an image being viewed by the requesting user;
acquire responsive notes data representative of at least one note of an event located within the geographic region from the notes data source in response to acquiring the request data; and
provide the responsive notes data to the requesting user identified in the request.

2. The system of claim 1, wherein the network is a network to which access is limited or restricted to the plurality of users employed to fly at least one of the plurality of aircraft by an owner or operator of the plurality of aircraft.

3. The system of claim 1, wherein the plurality of users are employed by an owner or operator of the plurality of aircraft.

4. The system of claim 1, wherein the notes data source is located in at least one of the plurality of aircraft.

5. The system of claim 1, wherein the notes data source is a source employed by an owner or operator of the plurality of aircraft.

6. The system of claim 1, wherein the location of an event defined for at least one note is at least one location along a flight path and a segment of the flight path previously flown or currently being flown in an aircraft occupied by the creating user.

7. The system of claim 1, wherein at least one note is further defined by at least one of a time of the note, a type of the note, a duration of the note, and a permission of the note.

8. A device for presenting notes to a pilot, comprising:
a processing unit including at least one processor coupled to a non-transitory processor-readable medium storing processor-executable code and configured to:
acquire note data comprised of at least one of a first note data or a second note data from at least one notes data source in response to request data provided to the notes data source and originating from an aircraft of a plurality of aircraft occupied by a first user of a plurality of users, where
the request data is representative of a request for the note data, where
the request provides an identification of the first user and a geographic region being presented in an image represented in an image data set to the first user,
the first note data is representative of at least one first note defined with a first location of a first event located within the geographic region and created by the first user prior to being presented with the image of the geographic region, and
the second note data is representative of at least one second note defined with a second location of a second event located within the geographic region and created by a second user of the plurality of users;
generate visual note data comprised of at least one of a first visual note data or a second visual note data as a function of the first note data or the second note data, respectively, where
the first visual note data is representative of at least one indication of one first note corresponding to one first location of one first event, and
the second visual note data is representative of at least one indication of one second note corresponding to one second location of one second event; and
update an image data set as a function of the visual note data, such that
each one of the at least one indication of a first note or each one of the at least one indication of a second note is presentable as an overlay against the image of the geographic.

9. The device of claim 8, wherein one of the at least one notes data source is a database accessible to the plurality of aircraft.

10. The device of claim 8, wherein
the image is being presented on a first display unit, and
one of the at least one notes data source is a second display unit.

11. The device of claim 8, wherein
at least one second location of a second event is at least one of a location along a flight path and a segment of the flight path previously flown or currently being flown in an aircraft occupied by the second user, and
at least one indication of one second note includes a visual presentation of the flight path.

12. The device of claim 8, wherein
each one of the at least one indication of one first note is
a visible note presenting a description of one first event, or
a symbol through which a visible note describing one first event is presented, and
each one of the at least one indication of one second note is
a visible note presenting a description of one second event, or
a symbol through which a visible note describing one second event is presented.

13. The device of claim 8, wherein
at least one indication of one first note is a symbol through which an audio note describing one first event is presented, and
at least one indication of one second note is a symbol through which an audio note describing one second event is presented.

14. The device of claim 8, wherein
the processing unit is further configured to:
provide the image data set to a display unit, whereby the image being presented to the first user is being presented by the display unit.

15. A method for presenting notes to a pilot, comprising:
acquiring, by at least one processor coupled to a non-transitory processor-readable medium storing processor-executable code, note data comprised of at least one of a first note data or a second note data from at least one notes data source in response to request data provided to the notes data source and originating from an aircraft of a plurality of aircraft occupied by a first user of a plurality of users, where
the request data is representative of a request for the note data, where
the request provides an identification of the first user and a geographic region being presented in an image represented in an image data set to the first user,
the first note data is representative of at least one first note defined with a first location of a first event located within the geographic region and created by the first user prior to being presented with the image of the geographic region, and
the second note data is representative of at least one second note defined with a second location of a second event located within the geographic region and created by a second user of the plurality of users;

generating visual note data comprised of at least one of a first visual note data or a second visual note data as a function of the first note data or the second note data, respectively, where the first visual note data is representative of at least one indication of one first note corresponding to one first location of one first event, and the second visual note data is representative of at least one indication of one second note corresponding to one second location of one second event; and updating the image data set as a function of the visual note data, such that each one of the at least one indication of a first note or each one of the at least one indication of a second note is presentable as an overlay against the image of the geographic.

16. The method of claim 15, wherein
one of the at least one notes data source is
a database accessible to the plurality of aircraft, or
a display unit.

17. The method of claim 15, wherein
at least one second location of a second event is at least one of a location along a flight path and a segment of the flight path previously flown or currently being flown in an aircraft occupied by the second user, and
at least one indication of one second note includes a visual presentation of the flight path.

18. The method of claim 15, wherein
each one of the at least one indication of one first note is
a visible note presenting a description of one first event, or
a symbol through which a visible note describing one first event is presented, and
each one of the at least one indication of one second note is
a visible note presenting a description of one second event, or
a symbol through which a visible note describing one second event is presented.

19. The method of claim 15, wherein
at least one indication of one first note is a symbol through which an audio note describing one first event is presented, and
at least one indication of one second note is a symbol through which an audio note describing one second event is presented.

20. The method of claim 15, further comprising:
providing the image data set to a display unit, whereby the image being presented to the first user is being presented by the display unit.

\* \* \* \* \*